United States Patent [19]

Wisniewski

[11] Patent Number: 5,397,384
[45] Date of Patent: Mar. 14, 1995

[54] FURNITURE POLISH COMPOSITION

[75] Inventor: Karen Wisniewski, Bound Brook, N.J.

[73] Assignee: Colgate Palmolive Co., Piscataway, N.J.

[21] Appl. No.: 191,891

[22] Filed: Feb. 4, 1994

[51] Int. Cl.$^6$ ............................................... C09G 1/06
[52] U.S. Cl. ......................................... 106/8; 106/3; 106/5; 106/10; 106/11; 106/265; 106/123.2; 106/215; 106/287.14
[58] Field of Search ................. 106/265, 123.2, 215, 106/8, 11, 10, 5, 3, 287.14

[56] References Cited

U.S. PATENT DOCUMENTS 2,244,685  6/1941  Fritz et al. ................................ 106/8
2,856,297  10/1958  Geen ....................................... 106/8
3,931,079  1/1976  Wise et al.

FOREIGN PATENT DOCUMENTS 744403  2/1956  United Kingdom ..................... 106/8

Primary Examiner—Mark L. Bell
Assistant Examiner—C. M. Bonner
Attorney, Agent, or Firm—Richard E. Nanfeldt; Robert C. Sullivan; Murray Grell

[57] ABSTRACT

A composition which comprises approximately by weight 1 to 8 percent of a hydrocarbon solvent; 1 to 4 percent of a silicone; 1 to 5.5 percent of at least one nonionic surfactant; 0.5 to 3 percent of an alkali metal neutralized tall oil fatty acid and 0.25 to 2.5 percent of an unneutralized tall oil fatty acid.

7 Claims, No Drawings

FURNITURE POLISH COMPOSITION

FIELD OF THE INVENTION

The present invention relates to a furniture polish emulsion composition which comprises a oil in water emulsion containing a hydrocarbon solvent, a silicone, a nonionic surfactant, an alkali metal neutralized tall oil fatty acid, a wax, and optionally a hydrocarbon propellant.

BACKGROUND OF INVENTION

Furniture polishes containing a wax constituent in combination with an emulsifier are well known in the art. In U.S. Pat. No. 3,847,622 to Brandi, contains a wax component in addition to a solvent, an emulsifier, a lubricant, and water. The emulsifier may be sorbitan sesquioleate, tall oil alkanolamides, polyglyceroleate acid, the emulsifier being present in an effective amount, e.g., from 0.25 to 3.0% by weight of the composition. A polysiloxane is also included in the composition.

Another example of a wax-containing polish composition is illustrated in U.S. Pat. No. 3,929,492 to Chapman, said composition containing wax, organic polysiloxane, water and propellant.

U.S. Pat. No. 3,395,028 to Mackles discloses an aerosol wax and silicone oil furniture polish consisting of water, organic solvent, wax and the silicone oil. The emulsifier in the Mackles composition may be sorbitan sesquioleate, tall oil alkanolamides, polyglycerololeate.

U.S. Pat. No. 3,393,078 to Lockhart, et al, discloses a wax-containing micro crystalline wax and 15% montan wax having an acid value of 90 to 160.

A self-spraying wax composition which is disclosed in U.S. Pat. No. 2,907,664 to Schoenholz, et al, may contain as an example of a wax Gersthofen OP, a wax derived from montan wax, described as a mixture of the butylene glycol ester of montanic acid and calcium montainnate. Amine soap, borax, sorbitan fatty esters, etc., are the designated emulsifiers in these compositions.

Furniture polish compositions are disclosed in U.S. Pat. Nos. 4,013,475 to Liebowitz, et al, 4,265,663 to Gilcinski, et al and 3,836,371 to Kokoszka.

U.S. Pat. Nos. 2,782,124, 3,300,321, and 3,437,496, each to Rosenberg, et al, 2,925,349 to Koenig, et al, and 3,143,431, 2,963,379, 3,062,671, 3,053,681 and 3,060,046, each to Kaupp, et al, disclose the esterification of montan waxes so as to modify the hardness and performance in dry-bright polish compositions.

SUMMARY OF INVENTION

The furniture polish compositions of the instant invention comprises approximately by weight:
 (a) 1 to 15 percent of a hydrocarbon solvent
 (b) 1 to 5 percent of a silicone;
 (c) 1 to 5 percent of a nonionic surfactant;
 (d) 0.5 to 3 percent of an alkali metal neutralized tall oil fatty acid;
 (e) 0.25 to 2.5 percent of tall oil fatty acid (unneutralized);
 (e) 0 to 2.0 percent of a wax;
 (f) 0 to 0.5 percent of an emulsifier;
 (g) 0 to 25 percent of a hydrocarbon propellant mixture; and
 (h) the balance being water,
wherein the furniture polish, when the hydrocarbon propellant mixture is zero composition, has a viscosity at room temperature of about 1 cps to about 40 cps. The furniture polish composition has a pH of about 5 to about 8 and more preferably about 6 to about 7.5. The pH may be adjusted to facilitate the solubilization of the ingredients by the use of a weak acid (such as acetic acid) or a strong base (such as NaOH or KOH).

An object of the instant invention is to provide a furniture polish which is easily applied to and rubbed onto a finished wooden surface.

Another object of the instant invention is to provide a furniture polish which has good rub out properties and provides a uniform coating of the furniture polish on the wooden surface while imparting good protection against water spotting and a superior gloss without oily feel on the surface. This is accomplished with a minimum of hydrocarbon solvent which is undesirable due to regulations against volatile organic compounds.

DETAILED DESCRIPTION OF THE INVENTION

The present invention relates to a furniture polish composition which is preferably an emulsion. The furniture polish can be packaged as a liquid for direct application onto a wooden surface or in the alternative a hydrocarbon propellant can be added to the furniture polish composition and charged into an aerosol can.

The furniture polish compositions of the instant invention which provides superior wetting of furniture polish onto the finished wooden surface thereby enhancing the dissolving of stains and old waxes deposited on the surface. The instant furniture polishes provide a good gloss with minimal greasy feel, and excellent resistance to staining by water and smearing.

The furniture polishes of the instant invention comprises approximately by weight:
 (a) 1 to 15 percent of a hydrocarbon solvent;
 (b) 1 to 5 percent of a silicone;
 (c) 1 to 5 percent of a nonionic surfactant;
 (d) 0.5 to 3 percent of an alkali metal neutralized tall oil fatty acid;
 (e) 0.25 to 2.5 percent of tall oil fatty acid (unneutralized);
 (e) 0 to 2.0 percent of a wax;
 (f) 0 to 0.5 percent of an emulsifier;
 (g) 0 to 25 percent of a hydrocarbon propellant mixture; and
 (h) the balance being water.

The hydrocarbon solvent employed in the instant compositions is a hydrocarbon petroleum solvent having a boiling point range of about 85° C. to about 200° C. The hydrocarbon solvent will have a vapor pressure at 38° C. of about 4 to about 20k Pascal. The hydrocarbon solvents are added to the composition to clean soils off the furniture that do not respond to aqueous cleaning. The hydrocarbon solvents also help to solubilize waxes that may be present in the formula. The hydrocarbon solvents are selected from the group consisting of hexane, octane, paraffinic hydrocarbons such as naphtha, paraffinic hydrocarbons such as Isopass made by Exxon corp. or Soltrols made by Phillip Petroleum Corporation, limonene and mineral spirits such as Shell Mineral Spirits 150–160 made by Shell Chemical Company Petrochemical Company Petrochemicals Division. An especially preferred hydrocarbon solvent is Isopar C which is a mixture of branched chain aliphatic hydrocarbons with 7 or 8 carbons in the alkyl chain, having a boiling point range of 206° to 222° F.

The hydrocarbon solvent is used at a concentration of about 1.0 to about 15.0 weight percent, more preferably about 1.0 to 8.0 weight percent.

The instant composition will also contain about 0.5 to about 6 weight percent and more preferably about 1 to about 5 weight percent of a silicone. The silicone are dialkyl silicone such as dimethyl silicone which are referred to as "polydimethyl siloxanes." These are usually classified according to their viscosity which is an indicator of the molecular weight of the homopolymers. The preferred range for homopolymers of dimethyl silicone is 100 to 10,000 cps, more preferably 500 to 1000 cps. These polymers can be blended to yield mixtures with intermediate viscosities. These are added to give lubricity during rub-out, minimize smearing and impart a sheen to the polished surface. As is taught in the Polishes and Household Care MiniFormulary published by GE Silicones, the higher the viscosity of the silicone, the higher the sheen. However, lower viscosity silicones give better leveling and ease of application. It is therefore useful to use an intermediate viscosity to try to achieve the best average of both these properties. We have found that the oiliness or slipperiness of the polished surface also increases as the viscosity increases. As this greasy feel and slippery surface are not desirable attributes, our silicone is chosen in the lower end of the range to mitigate the greasy feel while maximizing the shine. This polish aims to produce a shine with minimum change in the tactile sensation, when the hand is rubbed over the surface, when compared to the unpolished furniture.

The nonionic surfactants that are used in the instant compositions function to lower the surface tension of the furniture polish which enables the furniture polish to more readily wet the wooden surface on which the furniture polish has been applied. They also function in these formulas to stabilize the emulsion of silicones (and any wax present), interacting synergistically with the fatty acid soaps used. They also help to give lubricity to the formula, when the formula is rubbed into the surface. The amount of nonionic surfactant must be adjusted carefully, because too high an amount of nonionic can lead to build-up of the formula on a polished surface and to a greasy feel. Formulas with too high an amount of nonionic seem to resist removal by subsequent applications of the formula, resulting in a building up of layers of product on the surface.

Nonionic surfactants are employed in the compositions at a concentration of about 0.5 to about 5.0 weight percent and more preferably about 1.0 to about 3.0 weight percent. Contrary to what is taught in "Furniture Polishes" by J. David Bower (Soap Cosmetic Chemical Specialties, May 1978), we find that the preferred nonionics for our oil in water formulations are those containing 5 to 8 moles of ethoxylation. They have an HLB of approximately 11 to 14. Examples are Neodol 91-6 or Neodol 25-7 from Shell.

The alkali metal neutralized tall oil fatty acid is made in situ during the manufacturing of the furniture polish by the reaction of a tall oil fatty acid and an alkali metal hydroxide, wherein potassium hydroxide is preferred. The final concentration of the alkali metal neutralized tall oil fatty acid in the furniture polish is about 0.5 to about 3 percent, more preferably about 1 to about 2 weight percent. Tall oil is particularly preferred that contains a large fraction of oleic acid in the distribution of fatty acids. Oleic acid gives good gloss and film clarity. The alkali metal neutralized tall oil fatty acids function as emulsifying agents for the silicone and any wax present, interacting synergistically with the nonionic surfactant. This combination of surfactants gives improved stability to the emulsion of silicone (and wax) during storage and application while still allowing the emulsion to break when the polish is rubbed out.

Not all of the fatty acid added to the formula is necessarily neutralized. An amount greater than that needed to give the soap cited above can be added and left unneutralized such that the final concentration of unneutralized fatty acid is 0.25 to 2.5 percent, preferably 0.5 to 1.5 weight percent. The unneutralized fatty acid adds to the lubricity of the formula during spreading. It also participates in the surfactant synergism with the nonionic surfactant and the soap. If there are any cracks in the wood finish, it will facilitate the interaction of the oily components of the polish with the wood. It also acts to enhance the glossiness of the film formed by the polish.

The combination of nonionic, soap, and fatty acid also gives a formula that foams when dispensed from an aerosol can. The texture of the foam can be adjusted by the changing the components of the aerosol spraying mechanism and the amount of propellant charged into the can. The solvent also participates, increasing the foam level over that acheivable with just the surfactant components. Foam can be desireable in that it helps the product to cling to vertical surfaces (legs of chairs and tables, paneling, etc.) and also helps to visualize the placement of the product. The foam is more visible to the eye of the user than if the product is dispensed from a finger pump sprayer. This would allow better placement of the product during use; furniture polish can be slippery on a floor surface, and the visible foam would help to show any product on the floor that should be wiped up to prevent a safety hazard. However, the foam also collapses readily so as to afford easy wiping and buffing.

The furniture polish contains about 0 to about 2.0 weight percent and more preferably 0.25 to about 1.0 weight percent of a wax which functions both as a polishing aid and protective agent while helping to impart a sheen upon the buffing of the furniture polish, whereas the sheen is resistant to water staining. Soft waxes are preferred. By soft waxes it is meant substances such as beeswax, or synthetic beeswax substitutes such as that available from Frank B. Ross Co., or Hoechst BJ. These have a penetration hardness (ASTM D 1321 needle) of greater than 1.0 mm, but they should also be less than 2.5 mm. Waxes such as Montan ester wax, carnuba wax or paraffin wax, polyethylene or polyethylene copolymers, and the like may be used, but they require more energy to buff to a sheen. However, they are also more resistant to smearing and give better water resistance. An example of this type of wax is Luwax TM EAS 1 (supplied by BASF) or Hoechst Wax E. Mixtures of waxes may also be used to achieve the desired level of ease of buffing, smear resistance, etc. The maximum hardness of the wax or wax mixture desired is approximately 0.1 mm. One mixture that gives excellent sheen and water resistance is carnuba wax (such as that supplied by Frank B. Ross Co.) and Montan ester wax (such as Hoechst Wax E) at a weight ratio of 1:1 to 1:1.5, preferably 1:1.2 to 1.4, may be used to give greater water staining resistance and a less slippery feel. The drop point of the wax used is between 60° and 110° C. The acid number of the wax or wax mixture will be between 10 and 75 mg KOH/g.

If a wax is incorporated into the formula, then an emulsifier may be added to a premix of the wax in water to aid in the addition of the wax to the formula. The emulsifier is mixed into one quarter of the volume of water heated to just below boiling. The wax is added subsequently. After all the wax has been added, the mixture is agitated for 20 minutes. The rest of the water (preheated to the same temperature as the mixture) is then added and stirred thoroughly. It is then cooled to room temperature. This wax concentrate is added to the other ingredients of the formula to produce the finished polish. Generally the concentrate contains approximately 2.5 to 10 percent wax and 1 to 5 percent emulsifier with the balance being water. This concentrate would then be added at 10 weight percent to the mixture of other ingredients to produce the polish. This method efficiently disperses the wax without needing to add hot wax to the total polish mix. The emulsifiers used in the instant compositions generally have an HLB of about 2 to about 7 and are in the finished product at a concentration of about 0.1 to about 0.5 weight percent more preferably about 0.15 to about 0.3 weight percent of the emulsifier. Typical emulsifiers are glycols, glycerols and sorbitol esters of oleic, stearic, palmitic and lauric acids, especially sorbitan sesquioleate and sorbitan tristearate, or their ethoxylated products.

Another useful polishing aid and protective agent used in place of the wax is a mixture of about 0.05 to about 1.0 weight percent of chitosan and about 0.05 to about 1.0 weight percent of a fatty acid having 10 to 22 carbon atoms such as lauric acid. Chitosan is derived from chitin, a very abundant and underutilised natural material. If it is deposited in a proper film on a surface it should have good shine characteristics. It has to be complexed with the right counterion however, or its water solubility will cause the chitosan to redissolve when something wet is placed on the film; this would not give good water spotting protection to a wood surface. The counterion used, lauric acid, is especially suitable for polishes which incorporate a fatty acid soap as the emulsifying agent in the polish. The complexation of the chitosan is therefore entirely compatible with the previously discovered polish emulsification system.

Chitosan gives a good shine to the surface, similar to that given by traditional polishes, but without using petroleum derived wax substitutes or high priced natural waxes. It is easy to buff, spontaneously forming a flat film, without the use of customary lubricating agents such as silicone oils. It also avoids the greasy or oily feel (undesirable to consumers) of wax or oil films. It is also more smear resistant. It is also less slippery and therefore more easily retain objects on the polished surface.

Chitin is the second most abundant organic compound on earth, composing the outer shells of all insects and crustaceans. As can be seen by its performance in its natural state, it forms hard, shiny, water impermeable coatings. These seemed to be precisely the preferred characteristics in a furniture polish. However, chitin is not soluble in water, dilute acid, dilute or concentrated base, alcohols or other organic solvents. It is only soluble in concentrated acid. However, chitin can be changed into chitosan, a deacylated chitin, which is soluble in aqueous solutions below pH 6. Wood tends to be acidic itself, and so should tolerate pHs as low as 4 without damage. The lacquer coatings put on wood furniture should also be undamaged by these moderate acid pHs.

Other additives such as fragrances, perservatives such as formaldehyde at a concentration of about 0.05 to about 1.0 weight percent, more preferably about 0.05 to about 0.5 weight percent may be added.

The furniture polish emulsions of the instant invention may be applied directly onto the wooden substrate by pouring the furniture polish emulsion on the substrate and subsequently rubbing the furniture polish emulsion into the wooden substrate. The furniture polish may also be applied by spraying the emulsion onto the wooden substrate out of a container employing a conventional pump sprayer.

The furniture polish emulsion can be contained in an aerosol can which has an aerosol valve. When the furniture polish emulsion is contained in the aerosol can, the furniture polish emulsion will contain about 0.1 to 25 weight percent of propellant. Any conventional propellant may be used such as liquefied gaseous hydrocarbons and halogenated hydrocarbons and mixtures thereof. For example, preferred propellants are propane, n-butane and isobutane.

The furniture polish emulsion is a oil in water emulsion and is formed by well known conventional procedures. If a wax is to be incorporated into the formula then a premix concentrate emulsifying the wax is prepared as described above. Perservatives may also be incorporated into the wax premix at the end of mixing if desired. The water premix phase contains the tall oil fatty acid and an aqueous solution of an alkali metal hydroxide, wherein the tall oil fatty acid and the alkali metal hydroxide react "in situ" to form the alkali metal neutralized tall oil fatty acid and approximately 10% of the total amount of water. After the soap reaction is complete, the silicone oil and the hydrocarbon solvent are added. This helps to break up the soap mass and assure complete reaction and homogenation of the mixture. The wax premix phase is slowly added with medium or high-shear agitation to the water premix phase to form the furniture polish emulsion. Colors, preservatives (if not added previously) and fragrances can be added with mixing at this point to the furniture polish emulsion. The rest of the formula amount of water is added. Lastly, the nonionic surfactant is added. If the nonionic surfactant is added earlier at low levels of water, gel phases that hamper the complete mixing of the product can result. The pH of the furniture polish emulsion is about 5 to about 8 and more preferably about 6 to about 7.5.

The aspects, advantages and features of the instant invention well become apparent to one skilled in the art upon a review of the following examples, wherein the amounts of the ingredients are expressed in weight percent.

The examples are merely illustrative of the instant invention and are not intended to limit the scope of the instant invention.

EXAMPLE 1

The following formulas were prepared by the previously defined procedure:

|  | A | B | C | D | E | F | G |
| --- | --- | --- | --- | --- | --- | --- | --- |
| Isopar C | 5.0 | 5.0 | 5.0 | 10.0 | 5.0 | 5.0 | 4.6 |

|  | A | B | C | D | E | F | G |
|---|---|---|---|---|---|---|---|
| Silicone | 3.0 | 3.0 | 2.8 | 3.0 | 3.0 | 3.0 | 2.76 |
| $C_{12-15}$ alcohol EO 7:1 | 3.0 | 3.0 | 0 | 0 | 0 | 0 | 2.76 |
| $C_{14-15}$ alcohol EO 7:1 | 0 | 0 | 5 | 5 | 5 | 5 | 0 |
| Tall oil fatty acid | 2.5 | 1.5 | 3.8 | 3.0 | 3.0 | 3.0 | 2.3 |
| Montan ester wax | 0.55 | 0.55 | 0.55 | 0.55 | 0.55 | 0.55 | 0.506 |
| Carnuba wax | 0.42 | 0.42 | 0.42 | 0.42 | 0.42 | 0.42 | 0.386 |
| Fragrance | 0.5 | 0.5 | 0.5 | 0.5 | 0.5 | 0.5 | 0.46 |
| KOH(45% oaq) | 0.43 | 0.25 | 0.85 | 0.43 | 0.43 | 0.43 | 0.396 |
| Polysorbate 80 | 0.3 | 0.3 | 0.3 | 0.3 | 0.3 | 0.3 | 0.276 |
| water | Balance | Balance | Balance | Balance | Balance | Balance | Balance |
| Hydrocarbon Propellant | — | — | — | — | ' | — | 8.0 |
| pH | 7.6 | 7.6 | 7.7 | 7.7 | 7.7 | 5.1* | (w/o propettant) 7.6 |

*pH adjusted with hydroxyacetic acid

The formulas were evaluated by procedures outlined in ASTM D 3751-89a except that only one evaluator was used. The evaluations for uniformity, smear resistance and water spotting were performed. A BYK Gardener Haze Gloss Meter was used to measure haze and glossiness of the surface. The gloss measurements were taken at 60°. The control polish in the experiments was Pledge Furniture polish. All of the formulas had good uniformity. The water spotting performance was equal or greater than the control, with especially good results from formulas C and D. All of the formulas showed superior smear resistance to the control. All of the formulas increased the clarity of the surface shine (decreasing haze measurement) with formulas A, E, and G being especially effective. However, the best formula for giving the best gloss on the surface (highest reflectance) were formulas A and G.

EXAMPLE 2

The following formulas were prepared by the previously defined procedure:

|  | A | B | C |
|---|---|---|---|
| Isopar C | 5.0 | 5.0 | 4.6 |
| Silicone | 3.0 | 3.0 | 2.76 |
| $C_{12-15}$ Alcohol E07:1 | 3.0 | 0 | 2.76 |
| $C_{12-14}$ Alcohol E07:1 | 0 | 5 | 0 |
| Tall oil fatty acid | 2.5 | 3 | 2.3 |
| Fragrance | 0.5 | 0.5 | 0.46 |
| KOH(45%) | 0.43 | 0.43 | 0.396 |
| Beeswax substitute | 0 | 0 | 0 |
| Polysorbate 80 | 0.3 | 0.3 | 0.276 |
| Water | Balance | Balance | Balance |
| Hydrocarbon propellant | — | 8 | |
| pH | 7.6 | 7.7 | (w/o propellant) 7.6 |

These formulas were evaluated by the same methods as the preceeding examples. Similar results were achieved, except that the water spot resistance decreased. The resistance was inferior to that of the control at ~30 minutes of contact between water and surface. The best haze reduction was seen in formula B and the best reflectance was seen with formulas A and C.

EXAMPLE 3

The following formulas were prepared by the previously defined procedure:

| Ingredients | A Chitosan complex alone | B Nonionic emulsion | C Nonionic soap emulsion | D Nonionic & soap emulsion | E Non & soap emulsion + tall oil | F Non & soap emulsion + silicone | G Non & soap emulsion + silicone | H Silicone alone formula | I Wax formula |
|---|---|---|---|---|---|---|---|---|---|
| Hydroxyacetic acid | 3.0% | 3.0% | 3.0% | 3.0% | 3.0% | 3.0% | 3.0% | 0 | 0 |
| Chitosan | 0.5% | 0.5% | 0.5% | 0.5% | 0.5% | 0.5% | 0.5% | 0 | 0 |
| Lauric acid | 0.5% | 0.5% | 0.5% | 0.5% | 0.5% | 0.5% | 0.5% | 0 | 0 |
| Isopar C solvent | 5% | 5% | 5% | 5% | 5% | 5% | 5% | 5% | 5% |
| Neodol 25-7 | 0 | 3% | 3% | 3% | 3% | 3% | 3% | 3% | 3% |
| Tall oil soap | 0 | 0 | 3.2% | 3.2% | 3.2% | 3.2% | 3.2% | 1.0% | 1.0% |
| Tall oil | 0 | 0 | 0 | 0 | 1% | 0 | 0 | 1.5% | 1.5% |
| Silicone 500 cps | 0 | 0 | 0 | 0 | 0 | 3% | 0 | 3% | 3% |
| Silicone 1000 cps | 0 | 0 | 0 | 0 | 0 | 0 | 3% | 0 | 0 |
| Wax | 0 | 0 | 0 | 0 | 0 | 0 | 0 | 0 | 1% |
| pH | 0 | 0 | 12 | 5 | 11 | 5 | 5% | 7.8 | 7.8 |

The original chitosan cloudy solution makes no difference in haze or gloss when polished onto a lacquered wood surface. Surfactants were added to emulsify the complex and improve the wetting of the treatment on the wooden surface. The formula with only nonionic surfactant made a slight decrease in the haze on the surface. The tall oil formulas made even smaller differences. However, the soap was produced by saponifying the tall oil fatty acid in situ; the pH had risen to above 7 and this would tend to destabilize the chitosan in solution. Therefore, a small amount of hydroxyacetic acid (<1%) was added to lower the pH back to 5. The soap/nonionic emulsion of chitosan/lauric acid had a dramatic effect on the haze, lowering it significantly, and also decreasing the gloss slightly. Silicone oils are often used in polishes to increase shine and lubricity. In this case, the added silicones increased haze therefore decreasing the increased film clarity achieved with the chitosan. However, the 1000 cps silicone maintained the gloss of the original surface. The last chitosan formula in the chart maintained the gloss of the original lacquer surface, but increased the apparent clarity (decreased the haziness) of the surface. If this formula is compared to two similar but not identical formulas containing only silicone oil or a mixture of silicone oil and wax, it can be seen that the performance of the chitosan formula is very similar, if not superior in reduction of haze.

The chitosan formulas with surfactant were also tested for water staining. Droplets of water were placed on a polished surface. The water formed a high bead similar in appearance to the performance of the other non-chitosan formulas. The water was left in place for ~1 hour. The bead of water gradually flattens, but never completely wets the surface. This was true of all the formulas and of Pledge Furniture Polish. When the water was blotted from the surface, there was no marring of the surface film or evidence that the water had been on the surface, except in the case of the Pledge where a slight dulling of the film took place visible at oblique angles.

What is claimed is:

1. A composition which comprises approximately by weight:
   (a) 1 to 8 percent of a hydrocarbon solvent;
   (b) 0.5 to 6 percent of a silicone;
   (c) 0.5 to 5 percent of at least one nonionic surfactant;
   (d) 0.5 to 3 percent of an alkali metal neutralized tall oil fatty acid;
   (e) 0.25 to 2.5 percent of an unneutralized tall oil fatty acid; and
   (f) the balance being water.

2. The composition of claim 1 further including 0 to about 25 wt. percent of a hydrocarbon propellant.

3. The composition of claim 2 further including about 0.25 to about 2.0 weight percent of a beeswax or beeswax substitute.

4. The composition of claim 1 further including about 0.05 to about 1.0 weight percent of chitosan and about 0.05 to about 1.0 weight percent of a fatty acid.

5. The composition of claim 4, wherein the fatty acid is lauric acid.

6. The composition of claim 5, further including sufficient hydroxy acetic acid to adjust the pH of composition to a range of about 5 to about 8.

7. The composition of claim 2 further including 0.25 to 1.0 weight percent of a mixture of a Montan ester wax and a carnuba wax in a weight ratio of carnuba wax to Montan ester wax of 1:1 to 1:1.5.

* * * * *